United States Patent [19]

Yasushi

[11] Patent Number: 5,195,709
[45] Date of Patent: Mar. 23, 1993

[54] TELEVISION RECEIVER SUPPORTING STRUCTURE OF ARM REST

[75] Inventor: Kanda Yasushi, Kanagawa, Japan

[73] Assignee: Koito Industries, Ltd., Tokyo, Japan

[21] Appl. No.: 599,914

[22] PCT Filed: Feb. 14, 1990

[86] PCT No.: PCT/JP90/00180

§ 371 Date: Dec. 21, 1990

§ 102(e) Date: Dec. 21, 1990

[87] PCT Pub. No.: WO90/10403

PCT Pub. Date: Sep. 20, 1990

[30] Foreign Application Priority Data

Mar. 10, 1989 [JP] Japan .................................. 1-26607
Jun. 30, 1989 [JP] Japan .................................. 1-76231

[51] Int. Cl.⁵ .................................................. E04G 3/00
[52] U.S. Cl. .................................. 248/280.1; 248/584; 297/194
[58] Field of Search .............. 248/584, 279, 598, 447, 248/280.1; 312/24, 30, 208, 242, 313, 322; 297/194

[56] References Cited

U.S. PATENT DOCUMENTS

| | | | |
|---|---|---|---|
| 453,776 | 6/1891 | McCory | 403/93 X |
| 1,254,569 | 1/1918 | Boal | 248/280.1 X |
| 1,821,802 | 9/1931 | Haskin | 248/447 |
| 1,891,814 | 12/1932 | Haskin | 248/447 X |
| 3,506,303 | 4/1970 | Smittle | 297/194 |
| 3,637,184 | 1/1972 | O'Brien | 248/279 |
| 4,754,945 | 7/1988 | Diamond | 248/279 X |

FOREIGN PATENT DOCUMENTS

| | | | |
|---|---|---|---|
| 452192 | 10/1949 | Italy | 297/194 |
| 453234 | 2/1970 | Japan . | |
| 53-88940 | 7/1978 | Japan . | |
| 55-116549 | 8/1980 | Japan . | |

Primary Examiner—J. Franklin Foss
Attorney, Agent, or Firm—Sughrue, Mion, Zinn, Macpeak & Seas

[57] ABSTRACT

A supporting structure for supporting a TV set on an armrest of a seat of an aircraft or other vehicle so that the TV set can be turned in a vertical plane between an operating position outside a cavity formed in the front portion of the armrest and a housing position within the cavity, can be turned about a vertical axis at the operating position, and can be tilted with respect to the vertical axis. The supporting structure includes a hinge mechanism provided at the front upper end of the cavity, and a turning mechanism supported on the hinge mechanism and supporting the TV set so that the TV set can be turned at the operating position in both horizontal and vertical planes. A hinge pin included in the hinge mechanism is provided at one end with a diametrical through hole expanding toward the opposite open ends. One end of a locking pin, included in a locking mechanism, engages one of the open ends of the diametrical through hole of the hinge pin when the hinge pin is at a first predetermined angular position and engages the other open end of the diametrical through hole when the hinge pin is at a second angular position differing from the first predetermined angular position by an angle of about 180°. The hinge mechanism is interlocked with a shock absorbing mechanism.

6 Claims, 10 Drawing Sheets

TELEVISION RECEIVER SUPPORTING STRUCTURE OF ARM REST

TECHNICAL FIELD

The preset invention relates to a personal TV set capable of being housed in a front lower portion of the armrest of a seat installed on aircraft or a vehicle and, more particularly, to a supporting structure for supporting a TV set on an armrest, capable of absorbing shocks and of supporting the TV set in a predetermined position.

BACKGROUND ART

Figure 21:
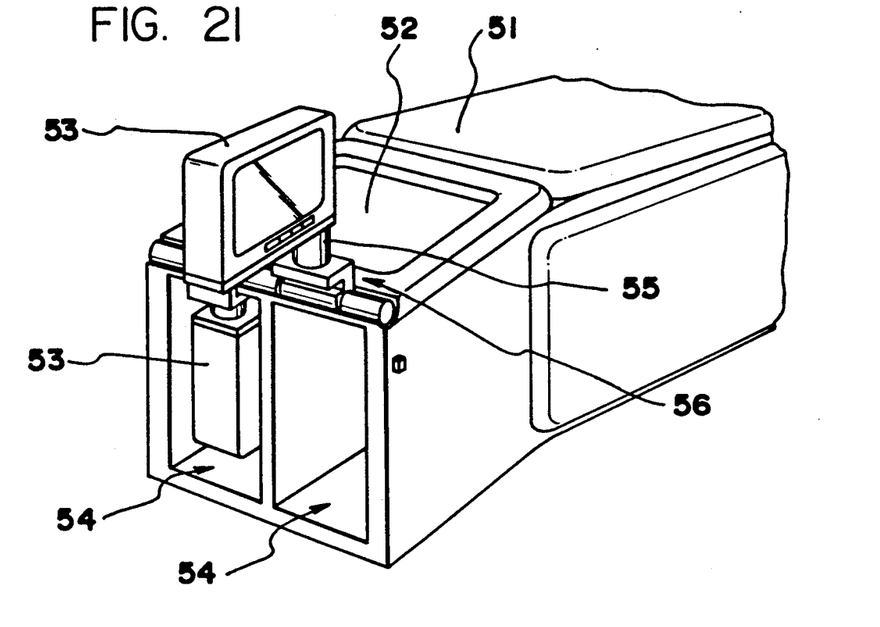
FIG. 21 is a perspective view of a seat provided with TV sets each supported by a conventional supporting structure.

Recently, an armrest of a seat installed on aircraft or a vehicle, capable of housing a TV set for personal use has been proposed. FIG. 21 shows such a known armrest 51. The armrest 51 is provided with two adjoining cavities 54 under a cocktail tray 52 formed in the front portion of its upper wall to house two TV sets 53, respectively. A hinge mechanism 56 fixedly holding a turning mechanism 55 is provided on the armrest 51 at the front end of each cavity 54 so as to turn the turning mechanism 55 thereon between the interior and exterior of the cavity 54. The TV set is supported by the turning mechanism 55 so as to be tilted in all directions.

Figure 22:
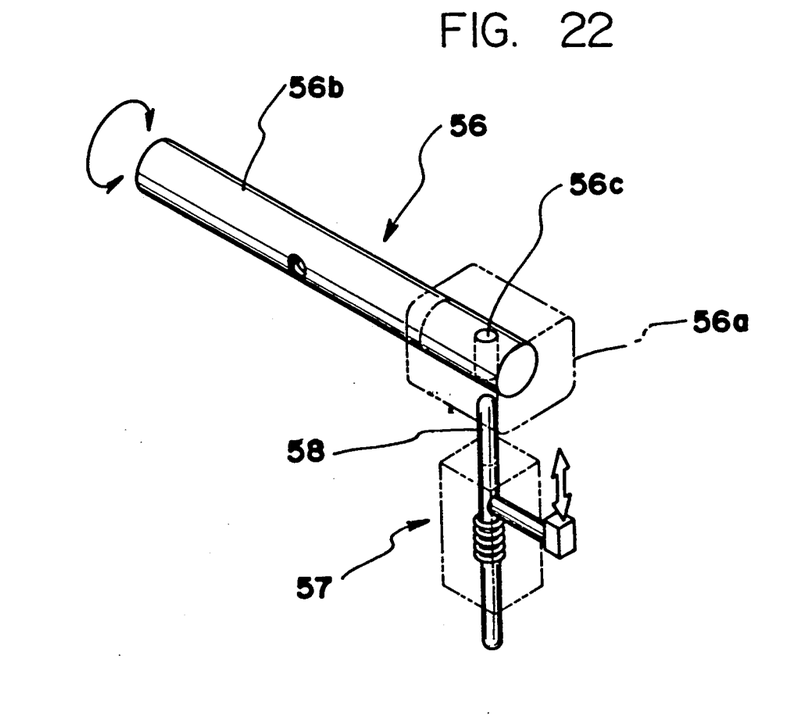
FIG. 22 is a perspective view of a locking mechanism included in the supporting structure of FIG. 21.

The hinge mechanism 56 is provided with a locking mechanism 57 as shown in FIG. 22. The locking mechanism 57 locks the TV set 53 at either a housing position or an operating position by inserting a locking pin 58 through a knuckle part 56a of the hinge mechanism 56 in a through hole 56c formed in one end of a hinge pin 56b. Thus, the turning mechanism 55 can be turned together with the hinge mechanism 56 substantially through an angle of 180° relative to the opening of the cavity 54, and the turning mechanism 55 can be locked at both the housing position and the operating position.

Thus, the TV set can be held fixedly at the operating position by inserting the extremity of the locking pin 58 through the knuckle part 56a of the hinge mechanism 56 in the through hole 56c formed in the hinge pin 56b. However, if the TV set 53 is set free at the operating position without inserting the locking pin 58 in the through hole 56c, the TV set 53 will be turn downward by gravity. Consequently, the TV set 53 may be subjected to shocks and wrecked or the fingers of the viewer may be injured by being caught between the TV set 53 and the armrest 51.

Figures 23, 24:
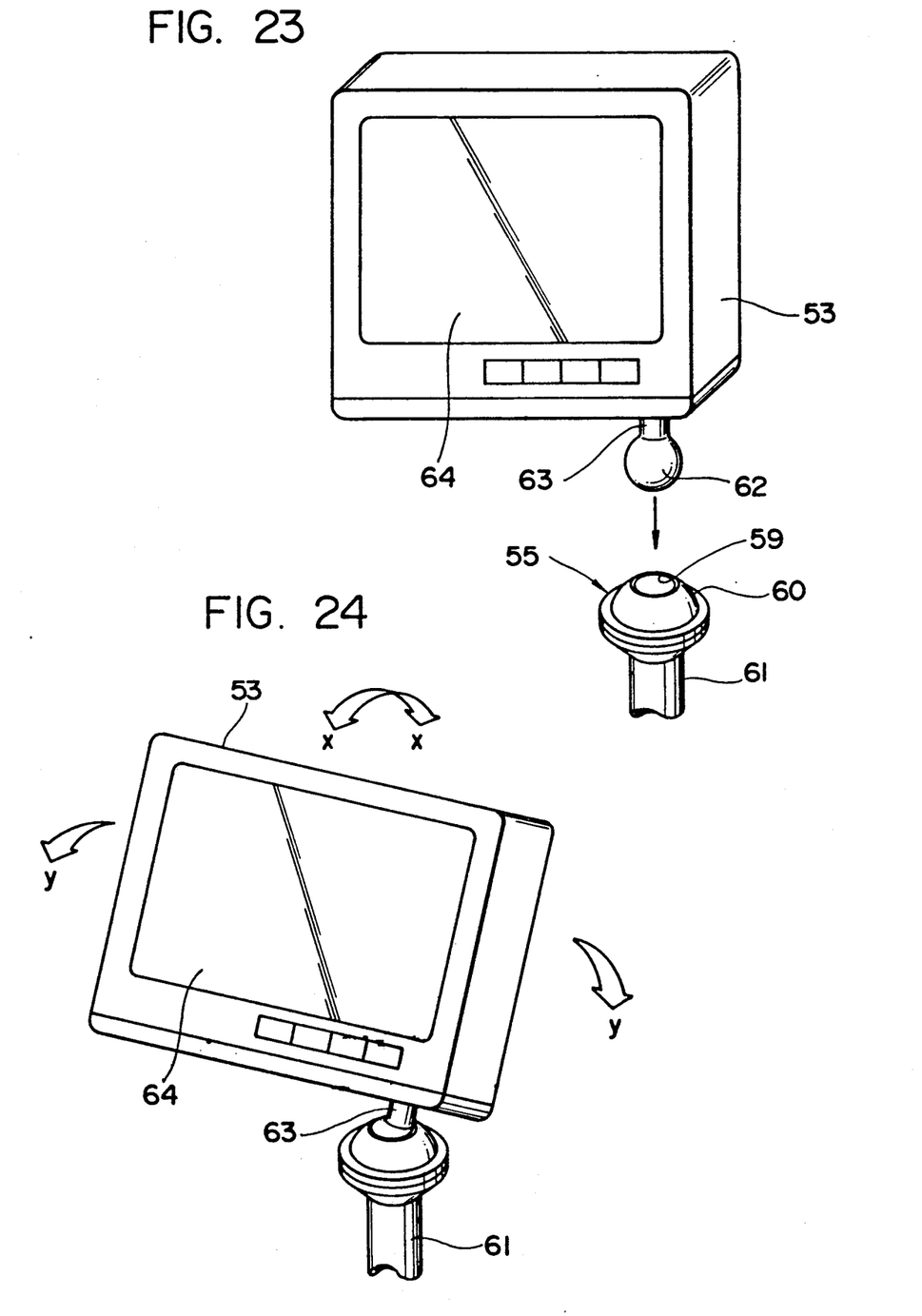
FIG. 23 is an exploded perspective view of a turning mechanism included in the supporting structure of FIG. 21.
FIG. 24 is a perspective view of assistance in explaining the moving range of the TV set supported by the supporting structure of FIG. 21.

As shown in FIG. 23, the turning mechanism 55 comprises a tubular support post 61 ending in a semispherical socket 60 provided with a recess 59 in its upper portion, and a stem 63 ending in a ball 62 received in the recess 59 for turning in all directions in the recess 59 to adjust the orientation and position of the TV set 53 supported on the turning mechanism 55. The stem 62 can be revolved through an angle of 360° about the axis of the semispherical socket 60. However, if the gripping force of the semispherical socket 60 decreases, the turning mechanism 55 is unable to hold the TV set 53 securely in place, so that the TV set 53 may be tilted undesirably in directions indicated by arrows x or in directions indicated by arrows y to dislocate the display unit 64 of the TV set from an appropriate position.

Furthermore, if the gripping force of the semispherical socket 60 is enhanced to support the TV set 53 firmly, an increased frictional force acting between the semispherical socket 60 and the ball 62 of the stem 63 makes the positional adjustment of the TV set difficult.

The present invention has been made in view of the foregoing problems and it is therefore an object of the present invention to provide a TV set supporting structure incorporating a shock absorbing mechanism capable of preventing the accidental drop of a TV set supported thereon in turning the TV set from the operating position to the housing position.

It is another object of the present invention to provide a TV set supporting structure capable of securely holding a TV set supported thereon at the operating position.

DISCLOSURE OF THE INVENTION

To achieve the objects, the present invention provides a supporting structure for supporting a TV set on an armrest of a seat installed on aircraft or a vehicle, having a cavity for housing the TV set under a cocktail tray formed in the front portion of the armrest, comprising: a turning mechanism supporting the TV set; and a hinge mechanism provided on the front upper end of the armrest to support the turning mechanism so that the turning mechanism can be turned thereon to move the TV set between the interior and exterior of the cavity; characterized in that a hinge pin included in the hinge mechanism is provided with a diametrical hole expanding toward its open ends, a locking pin is provided so that the extremity thereof is able to engage the diametrical hole of the hinge pin, the diametrical hole is formed so that the extremity of the locking pin is able to engage the diametrical hole when the axis of the diametrical hole is substantially in a vertical position, and the hinge mechanism is provided with a shock absorbing mechanism.

The shock absorbing mechanism comprises a pinion fixed to the hinge pin, a swing lever pivotally supported on the frame of the armrest and provided with a sector gear on one end so as to engage the pinion, and a shock absorber cylinder having a piston rod connected to the other end of the swing lever.

In a modification, the swing lever provided with the sector gear is substituted by a rack provided so as to engage the pinion fixed to the hinge pin.

In another modification, an elastic shock absorbing member, such as a coil spring, is connected to the other end of the swing lever.

The turning mechanism comprises: a supporting socket unit provided in its upper end with a spherical socket having a guide slot extending in a predetermined direction; a ball end member consisting of a shank and a ball formed at the lower end of the shank and provided with at least one radial projection, and inserted in the supporting socket unit so that the shank projects from the upper end of the supporting socket unit through the guide slot and the radial projection engages a groove formed in the inner surface of the spherical socket of the supporting socket unit; and pressing means provided in the supporting socket unit so as to press the ball end member upward so that the ball of the ball end member is pressed against the inner surface of the socket of the supporting socket unit.

In using the TV set, the TV set is taken out from the cavity of the armrest by turning the TV set upward in a vertical plane on the hinge mechanism, the TV set is turned on the turning mechanism in a horizontal plane so that the display unit of the TV set is directed toward the viewer seated on the seat, the tilt of the TV set is adjusted, and then the TV set is fixed in a desired position.

The shock absorbing mechanism interlocked with the hinge mechanism brakes the turning motion of the hinge pin of the hinge mechanism to prevent the sudden drop of the TV set.

The hinge mechanism and the turning mechanism are arranged so that the center of gravity of the TV set is located outside the cavity of the armrest when the TV set is housed within the cavity. Accordingly, the TV set is turned automatically outside the cavity by gravity when the TV set is released from the locking mechanism to take out the TV set from the cavity of the armrest, which facilitates taking out the TV set from the cavity and setting the same at an operating position.

The ball end member can be turned about the axis of the shank thereof and can be turned in a horizontal plane about the axis of the radial projection of the ball of the ball end member, for example, within an angular range of about 90°. The three-dimensional range of movement of the ball end member can be defined by the guide slot formed in the upper end of the supporting socket unit and the guide slot formed in the inner surface of the socket of the supporting socket unit to limit the three-dimensional range of movement of the TV set.

A cable connected to the TV set is passed through a through hole formed through the ball end member to conceal the cable within the turning mechanism and to protect the cable from damaging.

BEST MODE FOR CARRYING OUT THE INVENTION

A supporting structure for supporting a TV set on an armrest, in a preferred embodiment according to the present invention will be described hereinafter with reference to the accompanying drawings.

Figure 1:
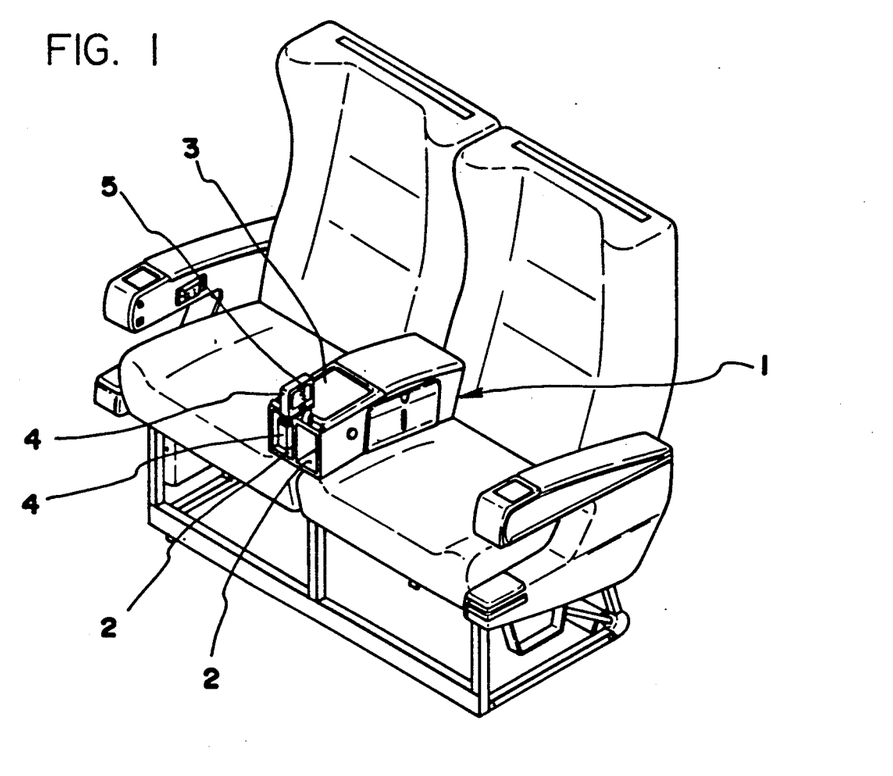
FIG. 1 is a perspective view of a seat having a center armrest provided with TV sets.
Figure 2:
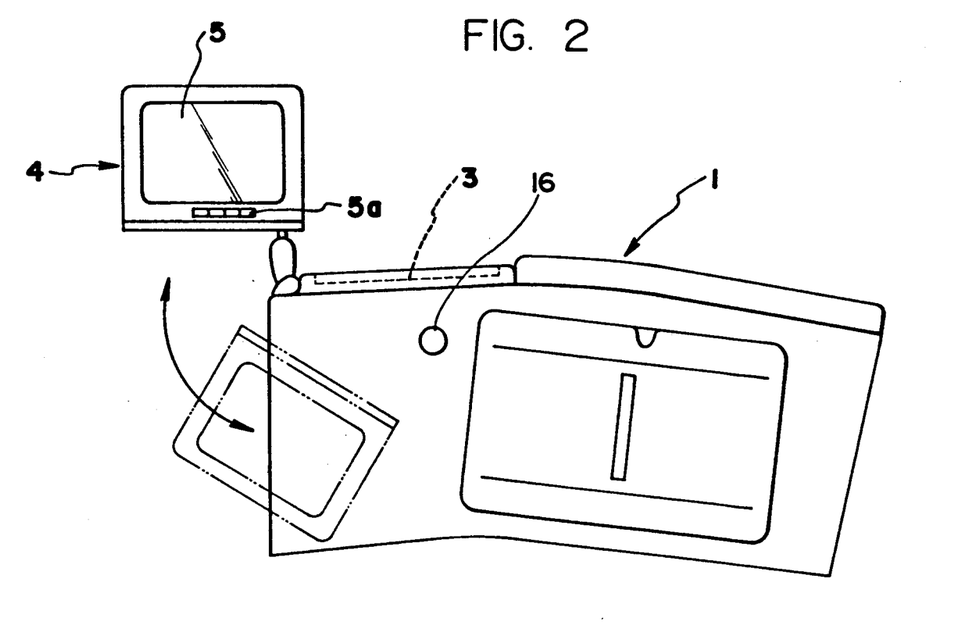
FIG. 2 is a side elevation of a portion of the seat of FIG. 1 connected with the present invention.
Figure 3:
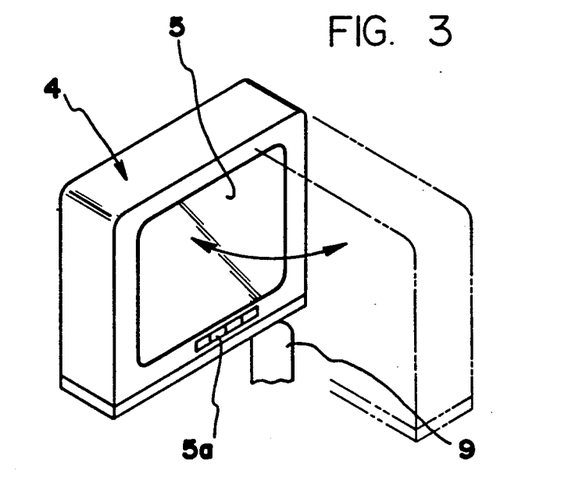
FIG. 3 is a perspective view of a TV set.

Referring to FIGS. 1 to 3, a center armrest (hereinafter referred to simply as "armrest") 1 of a seat installed on aircraft, a vehicle or a ship has cavities 2 formed side by side in the front portion of the armrest 1, and cocktail trays 3 in its front upper portion. Two TV sets 4 are housed respectively in the cavities 2 for viewers seated on the seat. Each TV set 4 has a relatively large liquid crystal TV display unit 5 having a flat shape and is supported on a turning mechanism 9 connected to a hinge mechanism 6 so as to be turned about an axis between an operating position outside the cavity 2 and a housing position within the cavity 2. Each TV set 4 is provided on its one side with the TV display unit 5 and an operating unit 5a provided with a main switch key, a channel selector key and a volume controller. A control panel, not shown, for controlling the TV set 4, provided with switches, a channel selector key a volume controller and an earphone jack is provided on the inside wall of the armrest 1. The control panel may be provided also with switches for controlling a reading light and a call switch for requesting the service of a stewardess, such as those provided generally on an aircraft seat.

FIGS. 4 to 7 show the hinge mechanism 6 formed on the front upper position of the armrest 1, and the turning mechanism 9 interlocked with the hinge mechanism 6.

Figure 4:
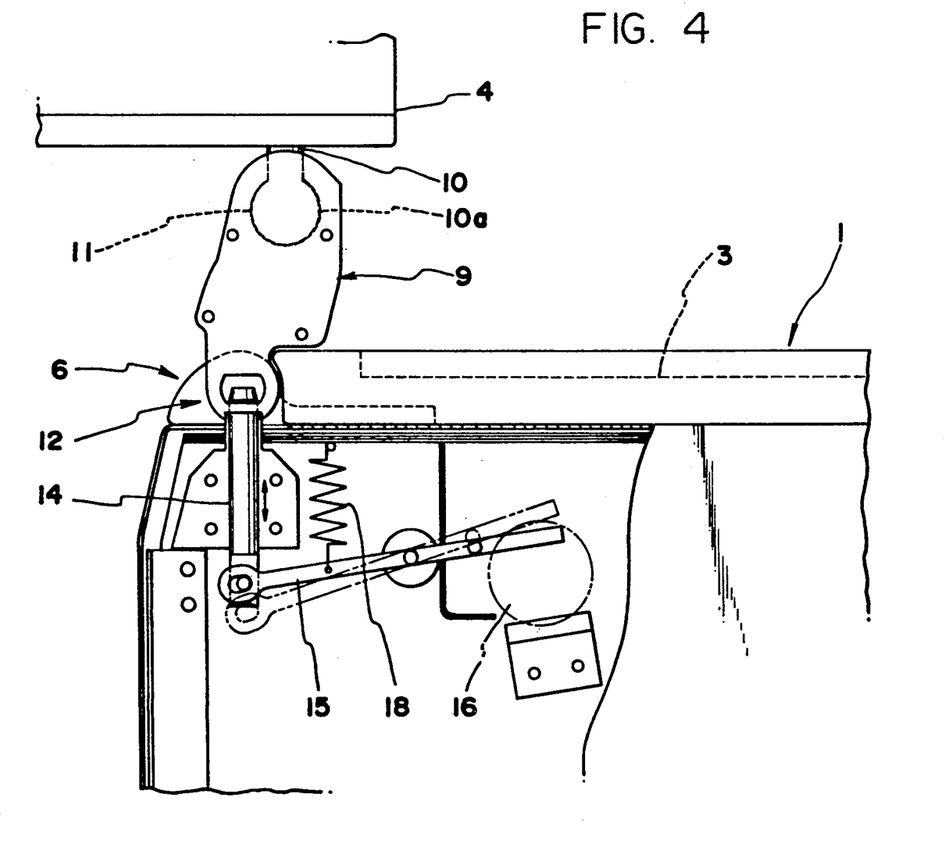
FIG. 4 is a side elevation of a hinge mechanism and a locking mechanism included in a supporting structure in a preferred embodiment according to the present invention.
Figure 5:
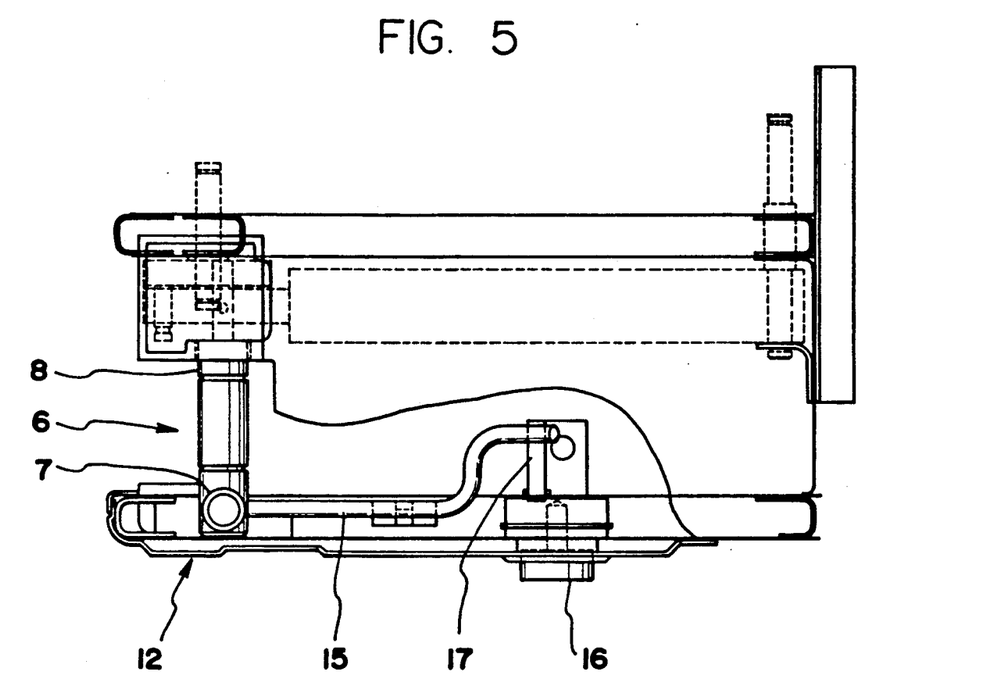
FIG. 5 is a plan view of the hinge mechanism.

The hinge mechanism 6 is attached to the front upper end of the armrest 1 near the opening of the cavity 2 to support the TV set 4 so that the TV set 4 can be turned through the opening of the cavity 2 and to secure the TV set 4 at predetermined positions, namely, the operating position outside the cavity 2 and the housing position within the cavity 2. A cable connected to the TV set 4 may be extended through the hinge mechanism 6.

The turning mechanism 9 is connected fixedly to one end of the hinge pin 8 of the hinge mechanism 6. The turning mechanism 9 comprises a ball end member 10 consisting of a shank attached to the bottom of the TV set 4 and a ball 10a formed at the extremity of the shank, and a supporting socket unit 11 attached to the hinge pin 8 of the hinge mechanism 6 and provided with a socket joined to the ball end member 10 so that the ball end member 10 is permitted to turn relative to the supporting socket unit 11. The turning mechanism 9 allows the TV set 4 mounted thereon to be turned substantially in a horizontal plane within an angular range of about 90° between a housing position and an operating position to adjust the orientation of the TV display unit 5 relative to the viewer. It is also possible to attach the supporting socket unit 11 to the TV set 4 and to attach the ball end member 10 to the hinge pin 8.

Figure 7:
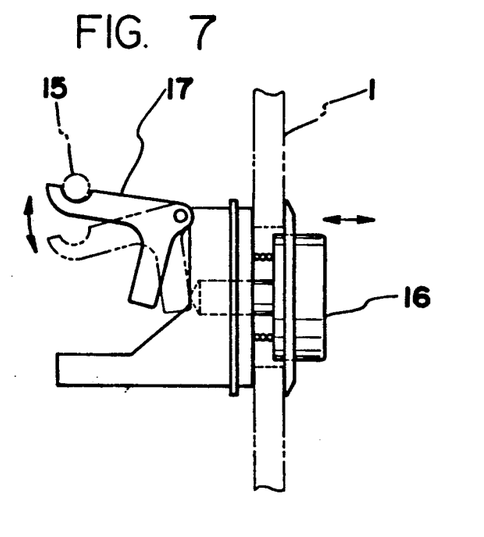
FIG. 7 is a front elevation of an essential portion of a push-button mechanism.

A locking mechanism 12 fixes the TV set 4 at the operating position and the housing position. The locking mechanism 12 comprises a locking pin 14, a lever 15 pivotally supported on the inner surface of the cavity 2 and having one end connected to the lower end of the locking pin 14, a lever 17 associated with the other end of the lever 15 to swing the lever 15, a push button 16 for turning the lever 17, and an elastic member 18, such as an extension coil spring, biasing the lever 15 in a direction to push up the locking pin 14. The locking pin 14 is inserted through the knuckle member 7 of the hinge mechanism 6 in a diametrical through hole 13 formed in the other end of the hinge pin 8 to fix the hinge pin 8 at two angular positions separated from each other by about 180°. When the push button 16 is pushed, the locking pin 14 is drawn out from the through hole 13 of the hinge pin 8 to allow the hinge pin 8 to turn together with the turning mechanism 9 supporting the TV set 4. When the TV set 4 is placed at the operating position or at the housing position, the locking pin 14 can be inserted in the through hole 13 of the hinge pin 8 to hold the TV set 4 fixedly at the operating position or the housing position.

Figure 6:
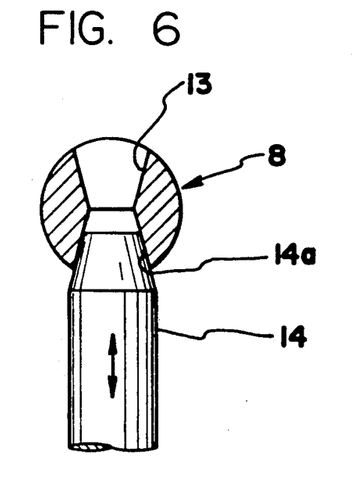
FIG. 6 is an enlarged fragmentary sectional view of an essential portion of the locking mechanism.

In this embodiment, the through hole 13 of the hinge pin 8 is tapered from the opposite ends toward the center of the hinge pin 8 as shown in FIG. 6, and the extremity 14a of the locking pin 14 is tapered accordingly, so that the locking pin 14 can be smoothly inserted in and extracted from the through hole 13. In case the viewer runs accidentally against the TV set 4 or an excessive force acts on the hinge pin 8, the tapered extremity 14a of the locking pin 14 is pushed out of the through hole 13 automatically by the hinge pin 8 to avoid damaging the TV set and injuring the viewer.

Figures 8, 9A, 9B:
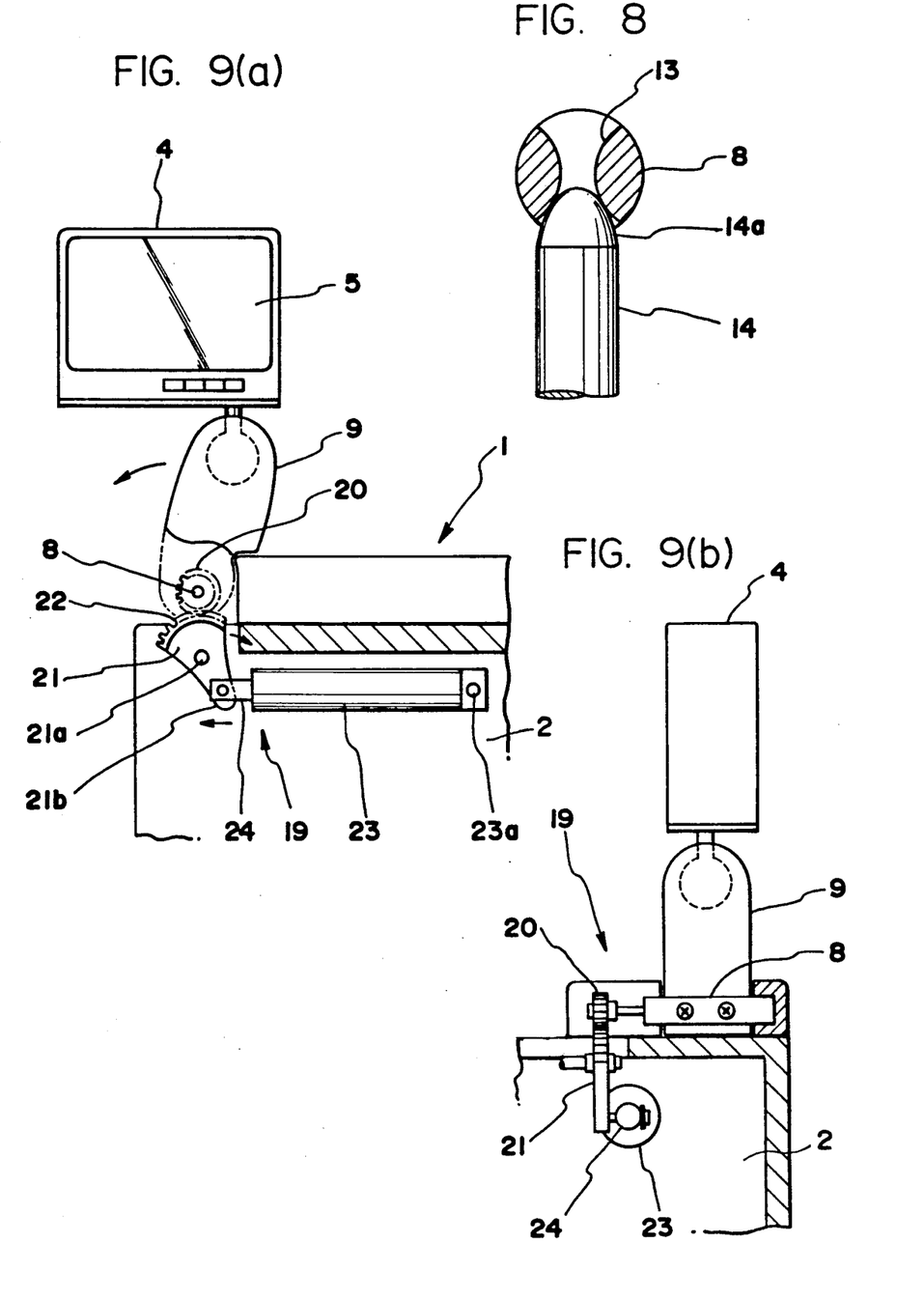
FIG. 8 is an enlarged fragmentary sectional view of a locking mechanism in another embodiment according to the present invention.
FIG. 9(a) is a partly cutaway side elevation of a shock absorbing mechanism.
FIG. 9(b) is a partly cutaway front view of the shock absorbing mechanism of FIG. 9(a)
Figure 10:
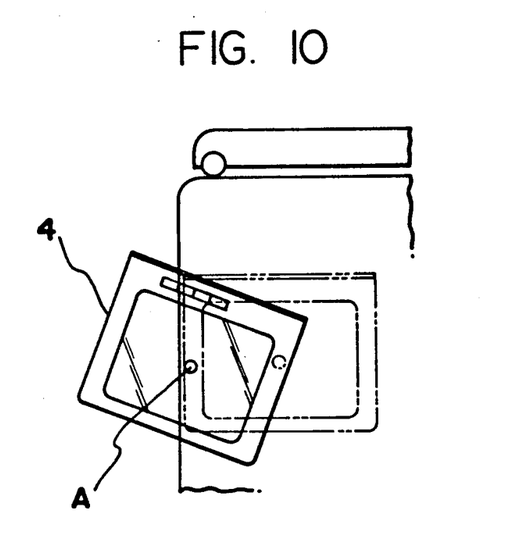
FIG. 10 is a view of assistance in explaining the position of the center of gravity of the TV set.

Forming the extremity 14a of the locking pin 14 and the opposite ends of the through hole 13 in a spherical shape as shown in FIG. 8 ensures further smooth disengagement of the extremity 14a of the locking pin 14 from the through hole 13.

Figure 11:
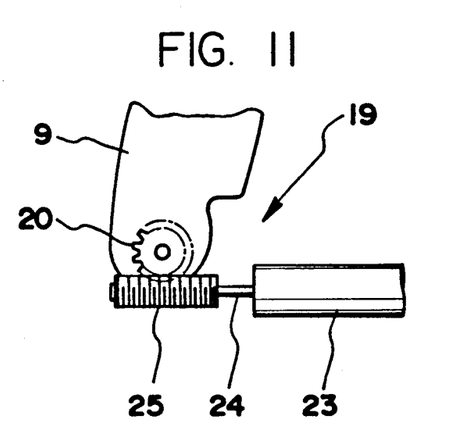
FIG. 11 is a side elevation of a shock absorbing mechanism in another embodiment according to the present invention.

Referring to FIGS. 9(a) and 9(b), a shock absorbing mechanism 19 is interlocked with the hinge mechanism 6 to prevent the sudden drop of the TV set 4. The shock absorbing mechanism 19 comprises a pinion 20 attached to the hinge pin 8, a swing lever 21 pivotally supported by a pin 21a on the armrest 1 and having one end provided with a sector gear 22 engaging the pinion 20, a sock absorbing cylinder 23 disposed within the cavity 2, pivotally supported by a pin 23a on the inner surface of the cavity 2, having a piston, not shown, provided with a small through hole and a valve, a cylinder, now shown, filled with a working fluid and axially slidably containing the piston, and a connecting rod 24 connecting the piston to the other end of the swing lever 21. The valve of the piston opens when the TV set 4 is taken out from the cavity 2 and closes to dampen the motion of the piston when the TV set 4 is turned from the operating position to the housing position within the cavity 2. The shock absorbing cylinder 23 is extended along one side surface of the cavity 2 (the upper side surface in FIG. 5) to secure a space for housing the TV set 4 in the other side (the lower side in FIG. 5) of the cavity 2. Since the center A of gravity of the TV set 4 as housed in the cavity 2 is dislocated toward the bottom of the cavity 2 from a vertical line passing the center of the hinge pin 8, the TV set 4 comes out of the cavity 2 automatically by gravity to facilitate setting the TV set 4 at the operating position when the hinge pin 8 is unlocked Referring to FIG. 11, a shock absorbing mechanism 19 in another embodiment according to the present invention employs a rack 25 instead of the sector gear 22. This shock absorbing mechanism 19 requires less space for installation.

Figure 12:
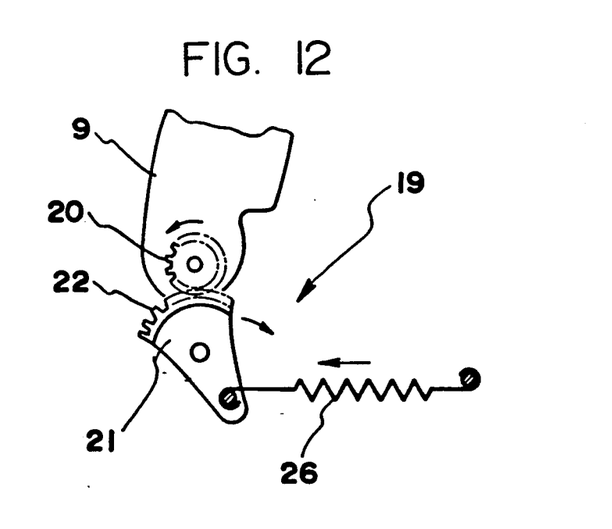
FIG. 12 is aside elevation of a shock absorbing mechanism in a further embodiment according to the present invention.

Referring to FIG. 12, a shock absorbing mechanism 19 in a further embodiment according to the present invention employs an elastic member 26, such as an extension coil spring, instead of the shock absorbing cylinder 23. The elastic member 26 has one end connected to the other end of the swing lever 21 and the other end connected to the inside surface of the cavity 2.

Figures 13, 14A, 14B:
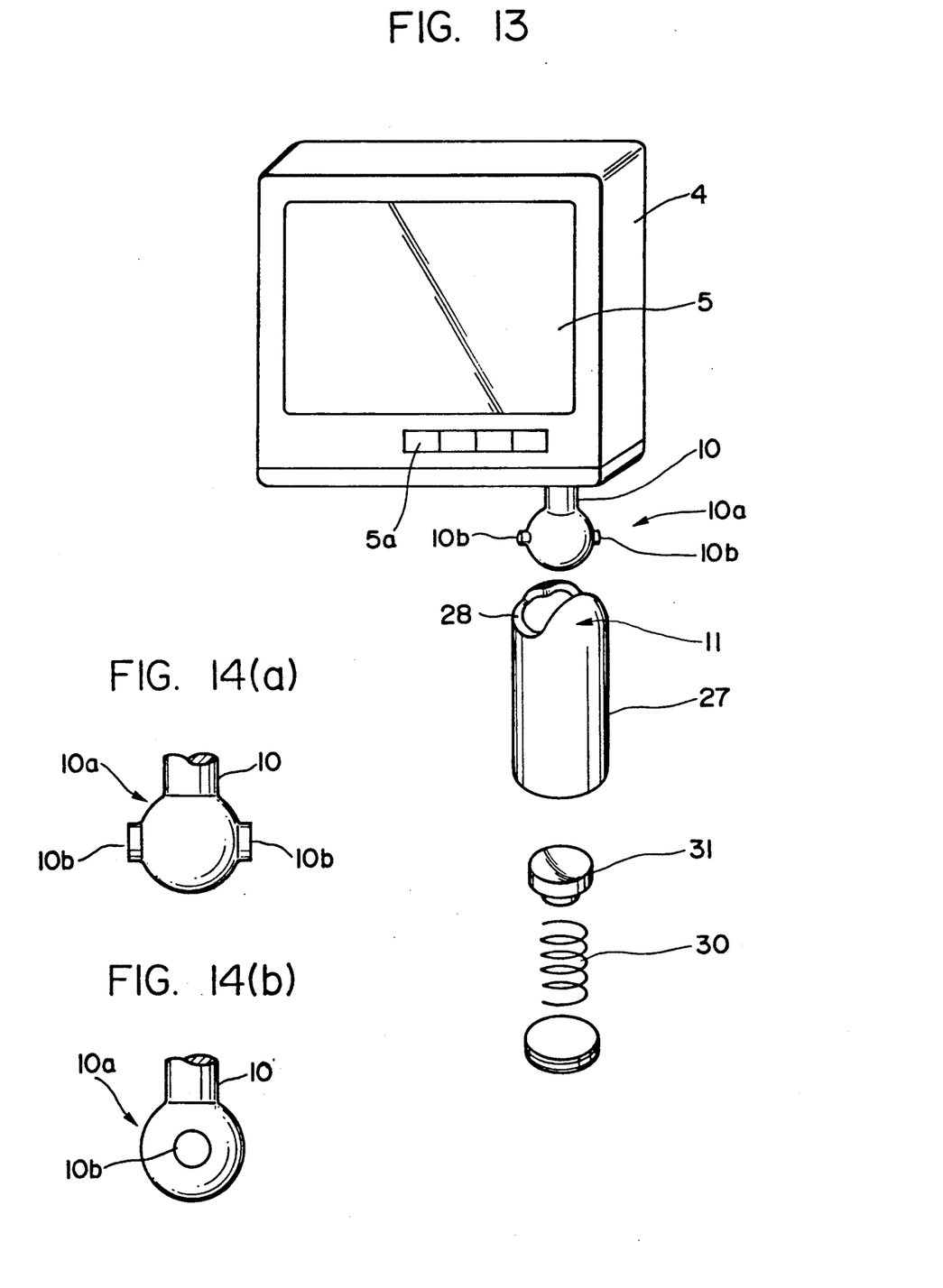
FIG. 13 is an exploded perspective view of a turning mechanism.
FIGS. 14(a) and 14(b) are an enlarged fragmentary front view and an enlarged fragmentary side elevation of a ball end member.
Figure 15A:
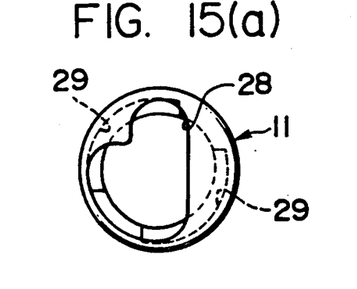
FIGS. 15(a) and 15(b) are an enlarged fragmentary plan view and an enlarged front view, respectively, of a supporting socket unit.
Figure 15B:
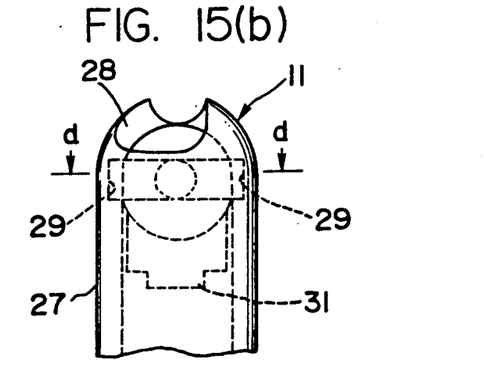
Figure 15C:
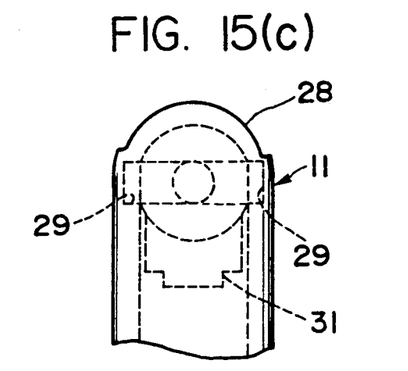
FIG. 15(c) is an enlarged right-hand side elevation of the supporting socket unit of FIGS. 15(a) and 15(b)
Figure 15D:
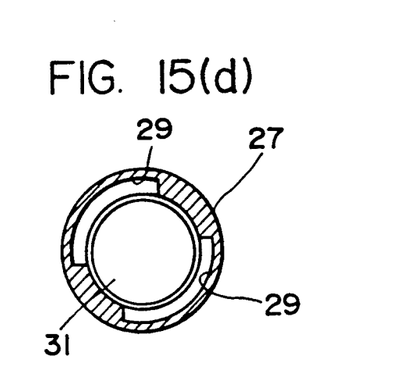
FIG. 15(d) is a sectional view taken on line d—d in FIG. 15(b)

As shown in FIGS. 13 to 16, the ball 10a of the ball end member 10 of the turning mechanism 9 is provided with diametrical opposite radial projections 10b as shown in FIGS. 14(a) and 14(b).

As shown in FIGS. 15(a) to 15(d), the supporting socket unit 11 for supporting the ball end member 10 has a tubular post 27. A socket is formed in the upper end of the tubular post 27, and the upper end of the tubular post 27 is slotted to form a guide slot 28 for guiding the shank of the ball end member 10. Guide grooves 29 having the shape of a circular arc for guiding the radial projections 10b are formed diametrically opposite to each other in the inner circumference of the upper portion of the tubular post 27 to limit the range of turning motion of the ball end member 10 within a predetermined angular range, for example, an angular range of about 90°.

Figure 16:
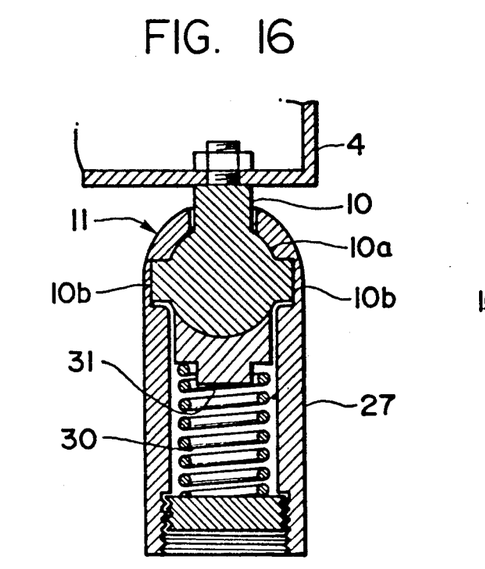
FIG. 16 is a sectional view of an essential portion of a turning mechanism.

Referring to FIG. 16, the turning mechanism 9 is assembled by putting the ball end member 10 through the lower open end of the tubular post 27 so that the ball 10a is received in the socket with the radial projections 10b received respectively in the guide grooves 29 and the shank of the ball end member 10 projecting outside through the guide slot 28, a holding member 31 is put in the tubular post 27, an elastic member 30 is put in the tubular post 27, and then an end plug is screwed in the lower end of the tubular post 27 to press the holding member 31 resiliently against the ball 10a. The tubular post 27 may be split laterally into an upper portion and a lower portion or may be split longitudinally into a two identical portions to facilitate assembling the turning mechanism 9.

The upper end of the shank of the ball end member 10 is fastened to the bottom wall of the TV set 4 to support the TV set 4. The ball end member 10 can be turned together with the TV set 4 in all directions in a horizontal plane relative to the supporting socket unit 11 to adjust the orientation of the TV set 4.

Figure 17:
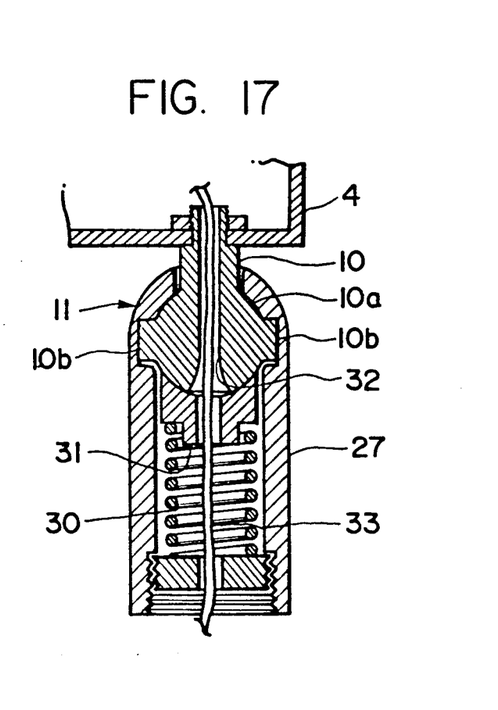
FIG. 17 is a sectional view of an essential portion of a turning mechanism in another embodiment according to the present invention.

FIG. 17 shows a modification of the turning mechanism 9. This turning mechanism 9 employs a ball end member 10 provided with an axial through hole 32, and a holding member 31 and an end plug provided respectively with axial through holes to pass a cable 33 connected to the TV set 4 through its interior.

A manner of using the supporting structure embodying the present invention will be described hereinafter.

In setting the TV set 4 for enjoying television, the push button 16 is depressed to extract the locking pin 14 of the locking mechanism 12 from the through hole 13 of the hinge pin 8. Consequently, the TV set 4 pops out from the cavity 2 of the armrest 1 by gravity. Then, the TV set 4 is turned upward in a vertical plane through an angle of about 180° together with the turning mechanism 6, drawing the connecting rod 24 of the shock absorbing mechanism 19 to the front. Since the shock absorbing cylinder 23 does not apply any resistance against the forward movement of the connecting rod 24, the TV set 4 can be easily taken out from the cavity 2 and raised to its operating position. The extremity 14a of the locking pin 14 drops automatically into the through hole 13 of the hinge pin 8 upon the arrival of the TV set 4 at the operating position to hold the TV set 4 in place. Then, the TV set 4 is turned in a horizontal plane on the turning mechanism 9 to direct the screen of its display unit 5 toward the viewer.

In housing the TV set 4 in the cavity 2, the TV set 4 is turned on the turning mechanism 9 to a position where the screen of the display unit 5 of the TV set 4 extends in parallel to a vertical plane including the inner side surface of the cavity 2 as shown in FIG. 2. Then, the push button 16 is depressed to extract the locking pin 14 of the locking mechanism 12 from the through hole 13 of the hinge pin 8 to release the hinge pin 8. Then, the TV set 4 is allowed to turn gradually downward in a vertical plane and enters the cavity 2. The shock absorbing mechanism 19 dampens the downward turning motion of the TV set 4 so that the TV set 4 is not subjected to shocks. Upon the arrival of the TV set at the housing position, the extremity 14a of the locking pin 14 drops automatically into the through hole 13 of the hinge pin 8 to fix the TV set 4 at the housing position.

Figure 18:
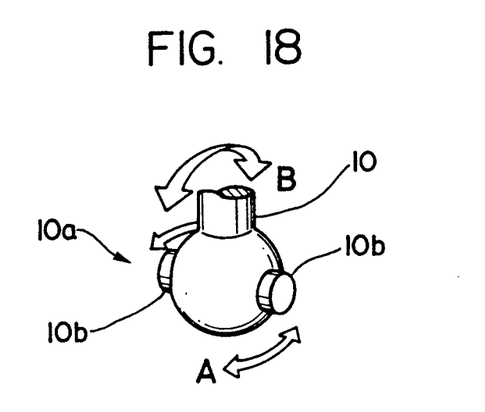
FIG. 18 is a perspective view of a ball end member of the turning mechanism of FIG. 16 or 17.
Figure 19:
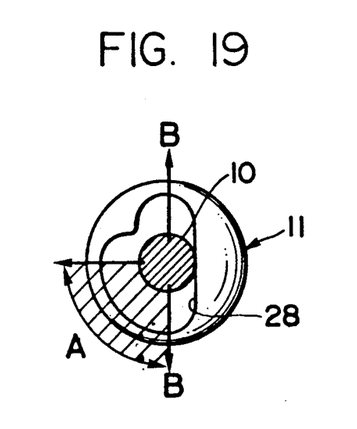
FIG. 19 is a plan view of a supporting socket unit, showing the range of tilting movement in a vertical plane of the ball end member of the turning mechanism included in the turning mechanism of FIG. 16 or 17.
Figure 20:
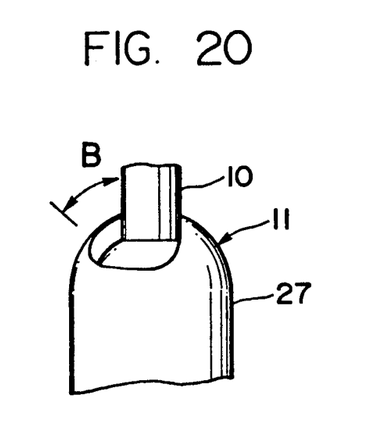
FIG. 20 is a front view of the turning mechanism of FIG. 16 or 17, showing the range of tilting movement of the ball end member of the turning mechanism of FIG. 16 or 17 about a horizontal axis.

As shown in FIGS. 18 to 20, the ball 10a of the ball end member 10 can be turned about the axis of the ball end member 10 in directions indicated by a double-head arrow A within the angular range of about 90° limited by the guide grooves 29, and the ball end member 10 can be turned about the axis of the radial projections 10b in directions indicated by a double-head arrow B in a vertical plane within an angular range limited by the guide slot 28. The guide slot 28 may be formed in a shape substantially resembling the letter J as shown in FIG. 19. Thus, the TV set 4 fixed to the extremity of the shank of the ball end member 10 can be set fixedly in a desired position.

Thus, the supporting structure enables the TV set to be set in an optimum position for viewing and enables the adjustment of the location and tilt of the TV set. The shock absorbing mechanism interlocked with the hinge mechanism prevents the sudden drop of the TV set so that the TV set may not be damaged.

The cable connected to the TV set can be passed through the interior of the turning mechanism so that the cable may not obstruct the movement of the TV set, the cable may not be damaged or broken by the turning mechanism, and the cable may not spoil the aesthetic appearance of the TV set and the supporting structure.

POSSIBILITY OF EXPLOITATION IN INDUSTRY

The supporting structure of the present invention for supporting a TV set on an armrest of a seat to be installed on aircraft or a vehicle, such as an automobile or a railway rolling stock, facilitates the use of the TV, ensures the safe use of the TV, and enhances the quality of the seat.

The supporting structure may be used for supporting any equipment to be housed in the cavity of the armrest and to be set at a using position outside the cavity of the armrest similarly to the TV set.

I claim:

1. A supporting structure for supporting a TV set on an armrest of a seat so that the TV set can be turned in a vertical plane between an operating position outside a cavity formed under a cocktail tray formed in the front upper portion of the armrest and a housing position within the cavity, can be turned about a vertical axis at the operating position and can be tilted with respect to the vertical axis, said supporting structure comprising:
   a hinge mechanism provided at the front upper end of the cavity; and
   a turning mechanism supported on the hinge mechanism and supporting the TV set so that the TV set can be turned at the operating position in both horizontal and vertical planes;
   characterized in that a hinge pin included in the hinge mechanism is provided at its one end with a diametrical through hole expanding toward the opposite open ends, a locking pin included in a locking mechanism is provided so that the extremity of the locking pin engages one of the open ends of the diametrical through hole of the hinge pin when the hinge pin is at a first predetermined angular position and engages the other open end of the diametrical through hole of the hinge pin when the hinge pin is at a second predetermined angular position differing from the first predetermined position by an angle of about 180°, and the hinge mechanism is interlocked with a shock absorbing mechanism.

2. A supporting structure for supporting a TV set on an armrest according to claim 1, wherein the shock absorbing mechanism comprises a pinion fixedly mounted on the other end of the hinge pin, a swing lever having one end provided with a sector gear engaging the pinion, and a shock absorbing cylinder operatively connected to the other end of the swing lever by a connecting rod.

3. A supporting structure for supporting a TV set on an armrest according to claim 2, wherein the shock absorbing cylinder is connected operatively to a rack engaging the pinion fixedly mounted on the other end of the hinge pin by a connecting rod.

4. A supporting structure for supporting a TV set on an armrest according to claim 1, wherein the shock absorbing mechanism comprises a pinion fixedly mounted on the other end of the hinge pin, a swing lever having one end provided with a sector gear engaging the pinion, and an elastic shock absorbing means, such as coil spring means or damping means, connected to the other end of the swing lever by a connecting rod.

5. A supporting structure for supporting a TV set on an armrest according to claim 1, wherein the turning mechanism comprises: a ball end member consisting of a shank, and a ball formed at one end of the shank and provided with at least one radial projection; and a supporting socket unit including a tubular post member provided with a socket for receiving the ball of the ball end member in its upper end portion, a guide slot in its upper end to guide the shank of the ball end member for tilting motion and at least one guide groove formed in the inner surface of the socket to guide the radial projection of the ball of the ball end member; a holding member placed contiguously with the ball of the ball end member fitted in the tubular post member with the ball received in the socket of the tubular post member and with the shank projecting outside through the guide slot; and an elastic member placed within the tubular post member so as to press the holding member elastically against the ball of the ball end member.

6. A supporting structure for supporting a TV set on an armrest according to claim 5, wherein the ball end member and holding member of the turning mechanism are provided respectively with axial through holes.

* * * * *